No. 679,090. Patented July 23, 1901.
P. J. PARMITER.
MACHINE FOR FLAT HOEING AND THINNING TURNIPS.
(Application filed Mar. 11, 1901.)
(No Model.) 2 Sheets—Sheet 2.
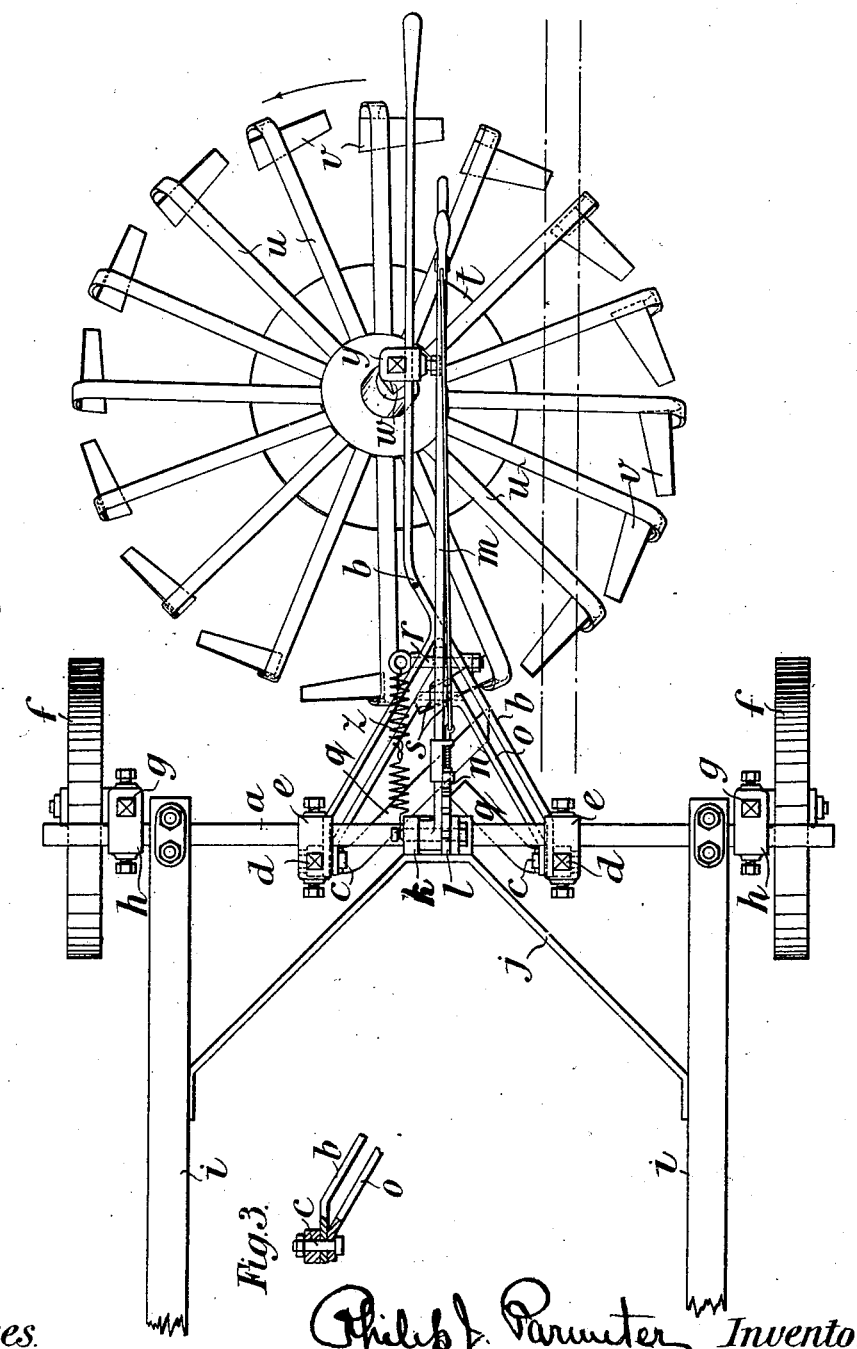
Witnesses.
J. K. Moore
B. W. Brockett.
Philip J. Parmiter, Inventor.
By Whitaker Prevost, Attys.

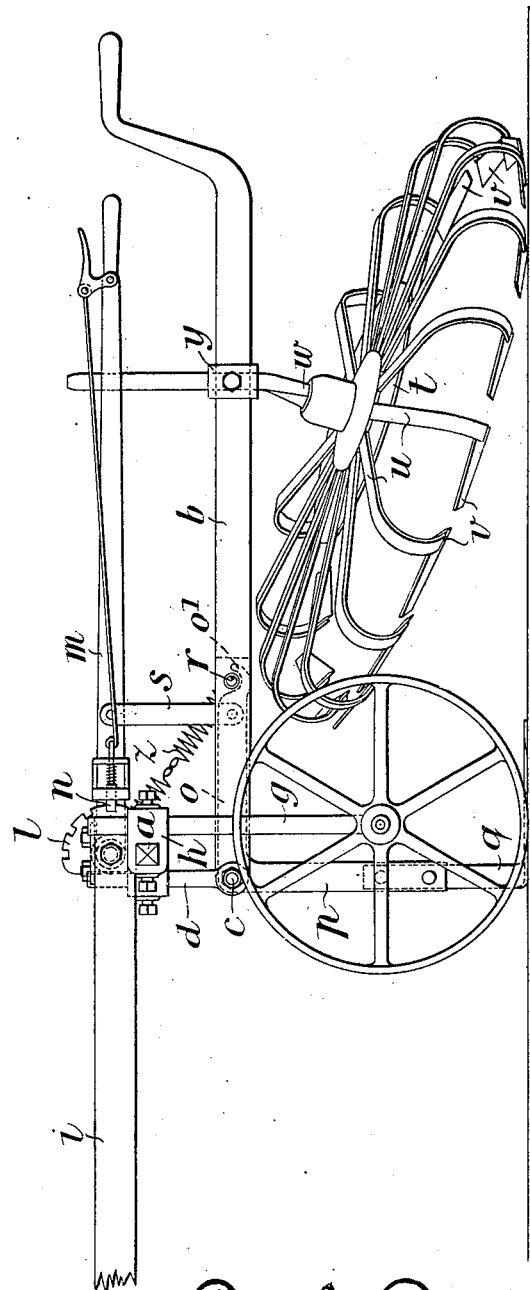

UNITED STATES PATENT OFFICE.

PHILIP JOSEPH PARMITER, OF SALISBURY, ENGLAND.

MACHINE FOR FLAT-HOEING AND THINNING TURNIPS.

SPECIFICATION forming part of Letters Patent No. 679,090, dated July 23, 1901.

Application filed March 11, 1901. Serial No. 50,719. (No model.)

*To all whom it may concern:*

Be it known that I, PHILIP JOSEPH PARMITER, a subject of the King of Great Britain, residing at Ansty, Salisbury, Wilts, England, have invented a new and useful Machine for Flat-Hoeing and Thinning Turnips and other Roots, of which the following is a specification.

My invention relates to an improved implement or machine for hoeing and thinning turnips and other plants, the chief object of my invention being to provide a machine that will single or thin turnips or other plants sown in rows.

In carrying out my invention I provide a revolving wheel or disk having a series of arms with hoes at their extremities, the said disk being arranged in such a position and at such an angle that it revolves by contact with the ground during the forward movement of the implement, thereby imparting to the hoes a combined rotary and forward movement through the row of roots to be thinned.

In the accompanying drawings, Figure 1 is a side elevation of an implement constructed according to my invention, and Fig. 2 is a plan. Fig. 3 is a view of a detail.

The main frame of the machine comprises a cross-bar $a$ and the beam $b$, the said beam at its front end being bifurcated and pivoted upon pins $c\ c$, carried in hangers $d\ d$, secured to the cross-bar $a$ by the clips $e\ e$, so that the said beam is capable of moving more or less upon the pins $c\ c$.

$f\ f$ are the traveling wheels, the axles of which are carried by vertical standards $g\ g$, attached to the cross-bar $a$ by clips $h\ h$.

$i\ i$ are the draft-shafts, which are secured to the cross-bar $a$, and $j$ is a shaft-stay, which is secured to a bracket $k$, fixed upon the cross-bar $a$. This bracket also carries a notched segment $l$, in connection with which is a pivoted lever $m$, having a spring-catch $n$, designed to engage with the notches in the segment $l$ for a purpose hereinafter described.

$o$ is a supplemental frame pivoted upon the pins $c\ c$, as clearly shown in Fig. 3, the said supplemental frame having its two ends bent downwardly to form stems $p\ p$, to which flat hoes $q\ q$ can be bolted. The rear end $o'$ of the said supplemental frame is arranged beneath but out of contact with a pin $r$ in the beam $b$, and the said frame $o$ is connected with the lever $m$ by links $s$, so that it is locked in position when in work, and when the said lever $m$ is raised it will turn the hoes $q\ q$ out of the ground and also lift the beam $b$. It will be noticed, however, that owing to the fact that the end $o'$ of the supplemental frame $o$ is arranged beneath the under side of the pin $r$ on the beam $b$ the said beam can be moved independently of the supplemental frame.

$t$ is my disk wheel, which comprises a series of arms $u\ u$, attached to a suitable boss and having at their outer ends the plates or hoes $v\ v$. The said wheel $t$ is mounted upon an axis $w$, which is attached to the beam $b$ by a clip $y$, the said axis being arranged in such relation to the beam that the disk wheel only comes into contact with the ground for a short portion of its circumference at one side of the rear half of the wheel, so that as the implement is caused to travel the contact of the wheel with the ground will cause the same to rotate without the necessity for providing driving mechanism.

With the construction hereinbefore described it will be understood that when the implement is moved forward the flat hoes $q\ q$ will work or clean the space between the rows to be thinned, while those hoes $v\ v\ v$ of the wheel $t$ which are in contact with the ground will as the said wheel rotates in the direction of the arrow, Fig. 2, move across the rows, and as each hoe while actually in the row (which in Fig. 2 is indicated by the dot-and-dash lines) moves forward, owing to the forward movement of the implement, it follows that it will continue to cut out plants from the row until the rotation of the wheel $t$ has moved it out of the row. The interval between the points at which one hoe $v$ leaves the row and the next adjacent hoe enters the row is the amount of the row which is left untouched by the hoes.

$z$ is a spring connecting the beam $b$ to the bar $a$, so that the weight of the beam $b$ and wheel $t$ is carried by the said bar $a$. The strength of this spring $z$ is so regulated as to hold the beam $a$ and the wheel $t$ clear of the ground and the row of plants to be thinned, and when so held the wheel $t$ does not revolve. When it is intended for the hoe-wheel to cut the row of plants, the attendant presses it down by means of the handle at the rear end of the wheel-beam, when it revolves and cuts out the roots required. The beam $b$, carrying the disk, is operated without interfering with the flat hoes $q$.

If both the wheel $t$ and the flat hoes $q$ $q$ are to be raised out of the ground, the spring-catch $n$ is disengaged from the notch in the segment $l$ and placed into one of the other notches in a manner which will be readily understood.

Having now particularly described and ascertained the nature of my said invention and in what manner the same is to be performed, I declare that what I claim is—

1. In an implement or machine for thinning turnips and other plants, a wheel or disk having a series of arms carrying hoes at their extremities and arranged at an angle with the ground so that the hoes at one portion of the circumference of the wheel only are in contact with the ground at one time whereby as the implement is caused to travel a rotary motion will be imparted to the said wheel or disk owing to its contact with the ground, giving the hoes a combined rotary and forward cut through the row of plants, substantially as described.

2. In an implement or machine for thinning turnips and other plants, the combination of a rotary wheel having peripheral hoes and adapted to be driven by contact with the ground and flat hoes for working the ground between the rows to be thinned, substantially as described.

3. In a machine for thinning plants, the combination with the frame and its supporting-wheels, of a beam pivotally connected with said frame, a revoluble wheel or disk having its axis secured to said beam, and arranged in an inclined position with respect to the surface of the ground, a spring normally holding said wheel out of contact with the ground and means for depressing said wheel into engagement with the ground and a series of hoes carried by peripheral portions of said wheel or disk, substantially as described.

4. In a machine for thinning plants, the combination with the main frame and its supporting-wheels, of a beam pivotally connected to said frame, a revoluble wheel or disk carried by said beam and having its axis arranged in an inclined position with respect to the surface of the ground, a series of hoes carried by said wheel or disk, a supplemental frame pivotally connected with the main frame, hoes carried by said supplemental frame, means for adjusting said supplemental frame, and independent means for raising and lowering said beam, substantially as described.

5. In a machine for thinning plants, the combination with the main frame and its supporting-wheels, of a beam pivotally connected with said main frame, a revoluble wheel carried by said beam having its axis arranged in an inclined position with respect to the surface of the ground, a series of hoes carried by said disk or wheel, a supplemental frame pivotally connected with said main frame, hoes connected with said supplemental frame, said supplemental frame being provided with a vertically-movable part adapted to engage a part connected with the said beam, to raise said beam, adjustable lifting mechanism connected to said supplemental frame, and independent means for raising and lowering said beam, substantially as described.

6. In a machine for thinning plants, the combination with the main frame and its supporting-wheels, of a beam pivotally connected with said main frame, a revoluble wheel carried by said beam having its axis arranged in an inclined position with respect to the surface of the ground, a series of hoes carried by said disk or wheel, a supplemental frame pivotally connected with said main frame, hoes connected with said supplemental frame, said supplemental frame being provided with a vertically-movable part adapted to engage a part connected with the said beam, to raise said beam, adjustable lifting mechanism connected to said supplemental frame, a spring connected to said beam to hold said disk or wheel normally out of contact with the ground, and means for depressing said beam to lower the wheel into contact with the ground, substantially as described.

PHILIP JOSEPH PARMITER.

Witnesses:
JOHN E. BOUSFIELD,
C. G. REDFERN.